(12) United States Patent
Rentschler

(10) Patent No.: US 9,485,470 B2
(45) Date of Patent: Nov. 1, 2016

(54) EVALUATION UNIT, EVALUATION METHOD, MEASUREMENT SYSTEM FOR A CRASH TEST VEHICLE MEASUREMENT AND A METHOD FOR PERFORMING A CRASH TEST VEHICLE MEASUREMENT

(71) Applicant: Dr. Ing. h.c.F. Porsche Aktiengesellschaft, Stuttgart (DE)

(72) Inventor: Walter Rentschler, Althengstett (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 948 days.

(21) Appl. No.: 13/753,893

(22) Filed: Jan. 30, 2013

(65) Prior Publication Data
US 2013/0194417 A1 Aug. 1, 2013

(30) Foreign Application Priority Data

Jan. 31, 2012 (DE) .......... 10 2012 100 798
Jun. 4, 2012 (DE) .......... 10 2012 104 811
Oct. 2, 2012 (DE) .......... 10 2012 109 351

(51) Int. Cl.
*H04N 7/18* (2006.01)
*G06T 7/00* (2006.01)

(52) U.S. Cl.
CPC ............ *H04N 7/18* (2013.01); *G06T 7/0042* (2013.01); *G06T 2207/30108* (2013.01); *G06T 2207/30204* (2013.01); *G06T 2207/30244* (2013.01)

(58) Field of Classification Search
CPC .......... H04N 7/18; G06T 7/0042; G06T 2207/30244; G06T 2207/30204; G06T 2207/30108
USPC .......................................... 348/135
See application file for complete search history.

(56) References Cited

U.S. PATENT DOCUMENTS

| 6,639,685 B1 | 10/2003 | Gu et al. | |
| 2004/0162154 A1* | 8/2004 | DeJohn | A63B 24/0003 473/266 |
| 2014/0085543 A1* | 3/2014 | Hartley | H04N 9/87 348/584 |
| 2015/0042833 A1* | 2/2015 | Lelescu | H04N 13/0029 348/218.1 |

FOREIGN PATENT DOCUMENTS

| DE | 10 2004 050 020 | | 4/2008 | |
| DE | 102009035840 | * | 2/2011 | ............ G01C 11/02 |
| EP | 00964239 a2 | * | 12/1999 | .......... G01M 17/007 |

* cited by examiner

*Primary Examiner* — Michael Lee
(74) *Attorney, Agent, or Firm* — Gerald E. Hespos; Michael J. Porco; Matthew T. Hespos

(57) ABSTRACT

An evaluation unit is provided for processing images and/or image sequences of measurement areas (8, 10, 12, 14, 16, 18) that are detectable on a crash test vehicle (4). Transmitted images and/or image sequences from at least one measurement sensor are utilizable. Additionally, image fusion apparatus is provided to produce digital image fusion of images and/or image sequences as image data (38, 40) of the same measurement area (8, 10, 12, 14, 16, 18). An evaluation method, a measurement system for a crash test vehicle measurement and a method for performing a crash test vehicle measurement also are provided.

19 Claims, 3 Drawing Sheets

EVALUATION UNIT, EVALUATION METHOD, MEASUREMENT SYSTEM FOR A CRASH TEST VEHICLE MEASUREMENT AND A METHOD FOR PERFORMING A CRASH TEST VEHICLE MEASUREMENT

CROSS REFERENCE TO RELATED APPLICATIONS

This application claims priority under 35 USC 119 to German Patent Appl. No. 10 2012 100 798.5 filed on Jan. 31, 2012, German Patent Appl. No. 10 2012 104 811.8, filed Jun. 4, 2012 and German Patent Appl. No. 10 2012 109 351.2, filed Oct. 2, 2012, the entire disclosures of which are incorporated herein by reference.

BACKGROUND OF THE INVENTION

1. Field of the Invention

The invention relates to an evaluation unit for processing images and/or image sequences of measurement areas that are detectable on a crash test vehicle, wherein transmitted images and/or image sequences from at least one measurement sensor are utilizable. The invention furthermore relates to an evaluation method, to a measurement system for a crash test vehicle measurement and to a method for performing a crash test vehicle measurement.

2. Description of the Related Art

U.S. Pat. No. 6,639,685 describes a method for operating an area measurement system that could be used in a vehicle crash test. Moreover, DE 10 2004 050 020 B4 discloses an evaluation apparatus and an evaluation method for capturing and evaluating image sequences of moving measurement objects with marked and/or unmarked measurement regions in a crash test.

The effects of a crash test on the vehicle are captured during the test with highly dynamic measuring instruments. These are largely regulated by law and are of critical importance in the design of safety components such as airbags, seat belt pretensioners, pedestrian protection systems etc. Another significant insight from crash tests is gained by comparing for example the state of the vehicle before and after the crash test. Here, deformations of the entire vehicle and the displacement of structural parts, of individual components, assemblies, axle bearings and other components are measured. The performance of such a crash test using multi-image photogrammetry systems in semi-automatic mode is known in this context. In this case, markings together with reference scales are provided by hand on the vehicle. A hand camera is used, for example, to take approximately 200-300 photos that are transferred to a computer. Here, a partially automated calculation of the position of the marks in 2D images commences and 3D coordinates are calculated therefrom. Other methods can be based on tactile probing systems. However, all systems that currently are used can be carried out merely in a partially automated manner. One of the factors here is that the measurement areas of the vehicle can have very different properties (metal, gloss varnish, leather, fabric, plastic) with respect to their reflection behaviour, their area size and their radii.

It is therefore an object of the invention to provide an evaluation unit, an evaluation method, a measurement system for a crash test vehicle measurement, and a method for performing a crash test vehicle measurement, which ensures fully automated performance of a crash test vehicle measurement with high-quality image data.

SUMMARY OF THE INVENTION

The invention relates to an evaluation unit with an image fusion means that enables digital image fusion of images and/or image sequences as image data of the same measurement area. Thus, different measurement images of the same measurement area can be fused qualitatively to enhance the measurement quality. Advantageously, image data fusion means are provided to enable optimization of the transmitted image data so that image data of lower quality also is made available to the image measurement.

A database preferably is provided in the evaluation unit. CAD data and already ascertained image recording data are stored in the database. Thus, zones of non-deformation and of deformation due to a crash test can be calculated better and assessed better against a background of mathematical similarity comparisons. Furthermore, already ascertained image recording data, such as camera position data and bearing data, can be stored and used as a priori knowledge. For example, it is possible to actuate difficult measurement areas via a control unit of the measurement system and thus to set the correct measurement camera position. Accordingly, self-learning means advantageously can be integrated to simplify the data utilization and increase the measurement speed in subsequent tests. Shade detection software may be provided to detect for example low-lying, partially covered or covered locations and accordingly to set recording positions that enable detection of those locations.

The invention also relates to an evaluation method for the above-described evaluation unit, in which different images and/or image sequences are optimized as image data of the same measurement area by being subjected to an image fusion data operation.

The invention also relates to a measurement system for a crash test vehicle measurement. The measurement system includes the above-described evaluation unit, vehicle positioning means, marking means for at least one measurement camera that has at least one measurement sensor with an image recording capability, a control unit, sensor means for the at least one measurement sensor that has the image recording capability so that a measurement area is detectable from different positions and/or at least two measurement sensors that differ in terms of image recording type and detect a measurement area. The measurement system permits automated performance of a crash test vehicle measurement with image data that satisfy the highest quality requirements.

The sensor means preferably has at least one further measurement sensor having the same image recording type. Thus, one measurement area can be detected in a simple manner with one image recording type from different positions. The sensor means can be assisted by camera positioning means.

Measurement cameras/measurement sensors may be provided to detect a measurement area according to different methods, such as for example a trilinear method, a stripe projection method, a laser triangulation method, deflectometry, a light field method etc. Thus, a multisensory measurement system arrangement can be provided and uses a suitable measurement method for each measurement area in an individual or fused manner to achieve the best possible image data.

At least one symmetry camera can be provided for detecting a plurality of symmetry structures of the crash test vehicle to ensure correct orientation of the crash test vehicle.

Alternatively or additionally, orientation cameras advantageously may be mounted fixedly on the measurement cameras and may communicate with reference markings arranged in the measurement space.

The method further relates to a method for performing a crash test vehicle measurement using the above-described measurement system. The method preferably includes recording images and/or image sequences as image data of a measurement area of a vehicle before a crash and transmitting the image data to the evaluation unit. The method continues by performing the vehicle crash is performed. The method proceeds by recording images and/or image sequences as image data of the same measurement area of the vehicle after a vehicle crash and transmitting those images to the evaluation unit. The measurement camera for image data recording step preferably is aligned orthogonally with respect to the measurement area, then is tilted by up to 20 degrees, and further is tilted by up to −20 degrees relative to the starting position for transmitting recording type image data to the evaluation unit. The measurement camera then is rotated by 90 degrees with respect to the starting position and the procedure is repeated.

In order to ensure exact orientation it is advantageous if at least three symmetry structures on the vehicle are recorded, such as for example headlights, windshield, hood ornaments, tail lights, rear window, tailgate etc. in order to align the vehicle relative to the symmetry cameras.

It is also possible, alternatively or additionally, for at least three reference markings arranged in the measurement space to be recorded in order to align the measurement cameras using orientation cameras which are fixedly arranged on the measurement cameras.

Alternatively, in order to align the measurement cameras, at least three marks can be arranged thereon, which marks can be measured by at least one orientation camera. These detect the measurement marks. Therefrom, the orientation of the measurement cameras can be ascertained.

At the beginning of each crash test, a fully automatic calibration of the currently used measurement sensors can be carried out and the calibration values can be archived for evaluation purposes in the evaluation unit and be read again for calculation purposes.

The invention will be explained in more detail below with reference to the drawing.

DETAILED DESCRIPTION OF THE PREFERRED EMBODIMENTS

Figure 1:
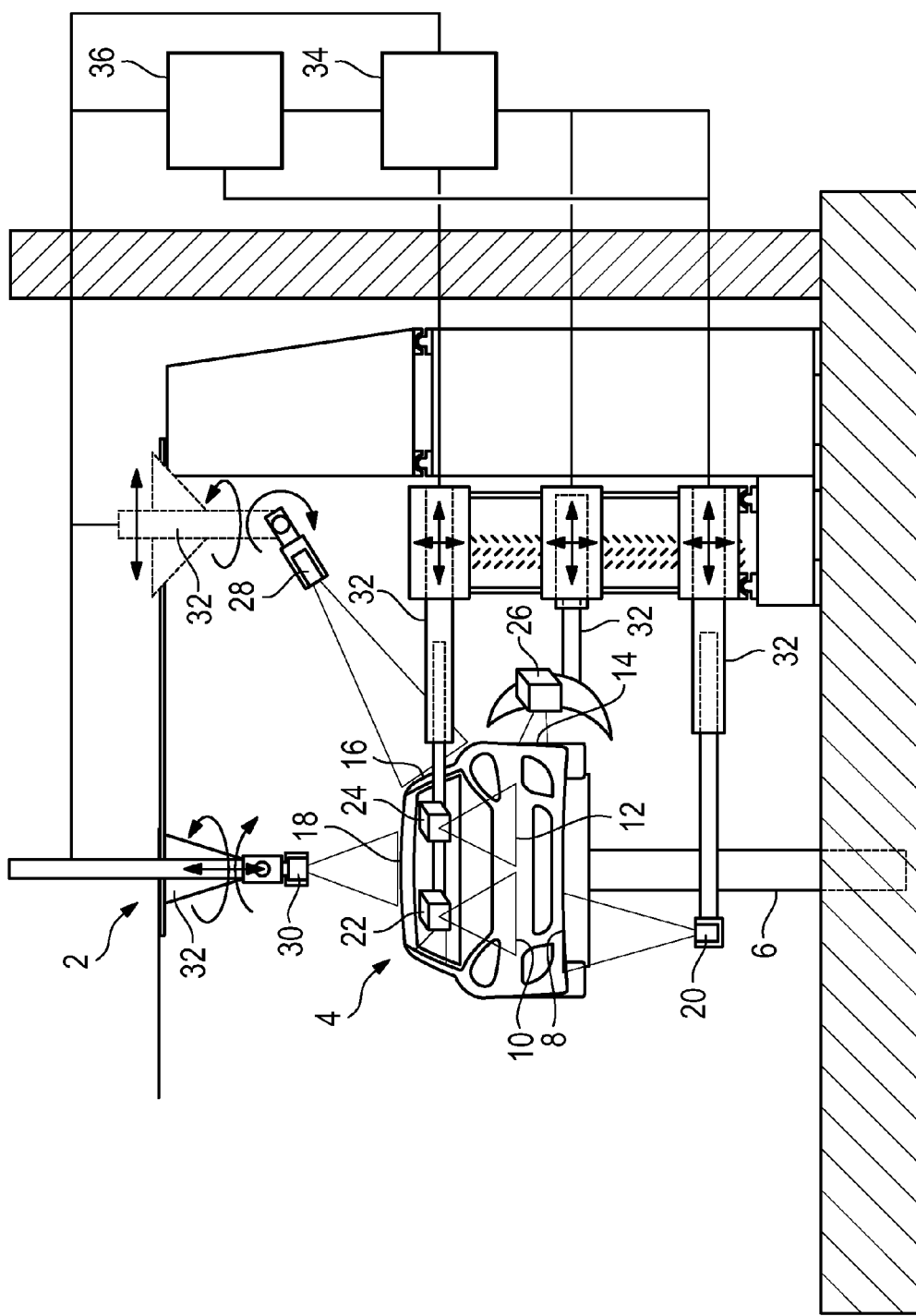
FIG. 1 shows a schematic view of a measurement system according to the invention.

FIG. 1 shows a measurement system 2 for a crash test vehicle 4 that is subjected to a crash measurement. Such a measurement system 2 is intended to be used to ensure a highly automated, areal vehicle measurement before and after a crash test. To this end the measurement system 2 has vehicle positioning means 6, which is illustrated in the present case simply by a lifting platform that is movable in the translational and rotary directions. Furthermore, marking means (not illustrated further) are provided for measurement areas 8, 10, 12, 14, 16, 18. The marking means are configured as measurement patterns that can be projected onto the measurement areas 8, 10, 12, 14, 16, 18 for example using projection means integrated in measurement cameras 20, 22, 24, 26, 28, 30. The measurement cameras 20, 22, 24, 26, 28 and 30 may have different image recording types to account for the different measurement area properties of the vehicle. The measurement cameras 20, 22, 24, 26, 28, 30 moreover are mounted movably according to the indicated arrows using camera positioning means 32. Each measurement camera 20, 22, 24, 26, 28, 30 in addition has a measurement sensor (not illustrated further) for the corresponding image recording type. Suitable measurement methods used here may be the trilinear method, the stripe projection method, the laser triangulation method, deflectometry and the light field method. The detected image data of the respective measurement areas 8, 10, 12, 14, 16, 18 are transmitted to an evaluation unit 34 to process and evaluate the image data. A control unit 36 is connected by way of a data link to the evaluation unit 34 and to the camera positioning means 32. It should be clear that the evaluation unit 34 and the control unit 36 do not have to be configured separately from one another.

The evaluation unit 34 has image fusion means for enabling digital image fusion of images and/or image sequences as image data of the same measurement area 8, 10, 12, 14, 16, 18.

Figure 2:
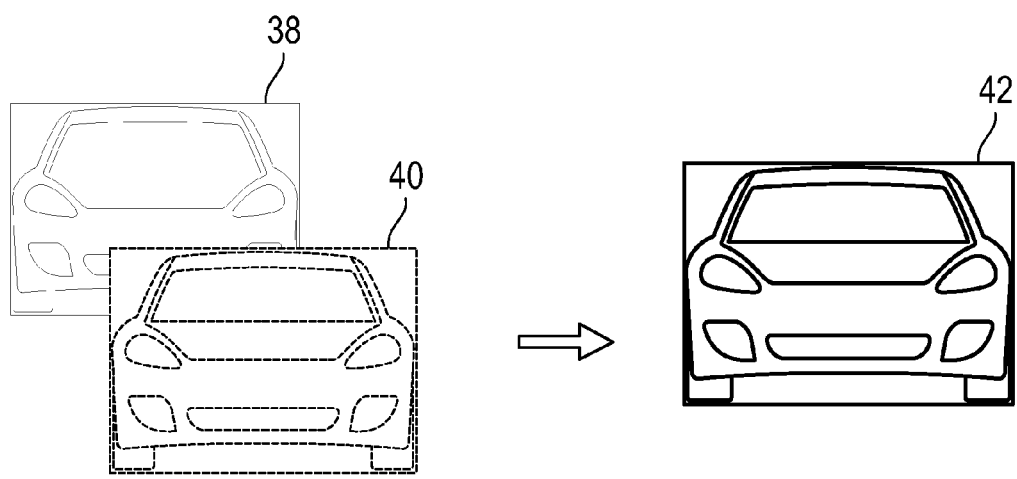
FIG. 2 shows an exemplary example for an image data fusion.

FIG. 2 shows an image data fusion of a measurement sensor for an image recording type that detects a front section of the vehicle 4. Two different image data items 38, 40 were detected by different measurement sensors and subsequently fused to form image 42. The different image qualities of the measurement sensors for the image data 38, 40 enables the image data of the images 42 to be optimized with respect to the contrast values and the depth of field etc. Image data from measurement sensors with the same image recording type, recorded from different angles can be fused to significantly enhance the quality of the image data. Furthermore, the individual image data items can be optimized before the fusion so that undesired and/or insignificant data is removed.

The evaluation unit 34 also can have a database. CAD data for example of the vehicles to be examined or a priori knowledge from previous crash tests can be stored in the database to assess the evaluations or the deformation patterns more quickly and efficiently. Furthermore, the evaluation unit 34 can have self-learning means so that the measurement means orientation data are updated automatically. Furthermore, the evaluation unit 34 can have image shade detection software so that the control unit 36 can actuate measurement positions more efficiently.

A method for performing a crash test measurement can use the measurement system 2. The method includes recording images and/or image sequences as image data of the measurement areas 8, 10, 12, 14, 16, 18 of the vehicle 4 before a crash. These image data are transmitted to the evaluation unit 34 and combined to form the entire vehicle model. The method continues by performing the vehicle crash is performed. Images and/or image sequences then are recorded as image data of the same measurement areas 8, 10, 12, 14, 16, 18 as image data of the vehicle 4 after a vehicle crash and transmitted to the evaluation unit 34. The image data fusion is carried out in the evaluation unit 34 and the partial areas are combined to form the entire vehicle model.

The measurement cameras 28 and 30 initially are aligned orthogonally to the measurement surfaces 16, 18 and image recording is performed. The measurement cameras 28, 30 then are tilted by +10 degrees and image recording is performed again. The measurement cameras 28, 30 then are tilted by −10 degrees and image recording is performed another time. The tilting is always as compared to the starting position. Subsequently, the measurement cameras 28, 30 are rotated by 90 degrees relative to the starting position, and the three described steps for image recording are repeated. In this way, image data from a variety of perspectives is available for the measurement areas 16 and 18. The image data can be optimized by image data fusion in the evaluation unit 34. Another possibility for image data fusion is the detection of the same measurement area using cameras having measurement sensors with different image recording types. This is possible in the illustrated embodiment by the camera 28 and the camera 26 for the measurement area 14. Image data fusion can be performed in the evaluation unit 34 even here due to the different image data of the same measurement area 14.

Figure 3:
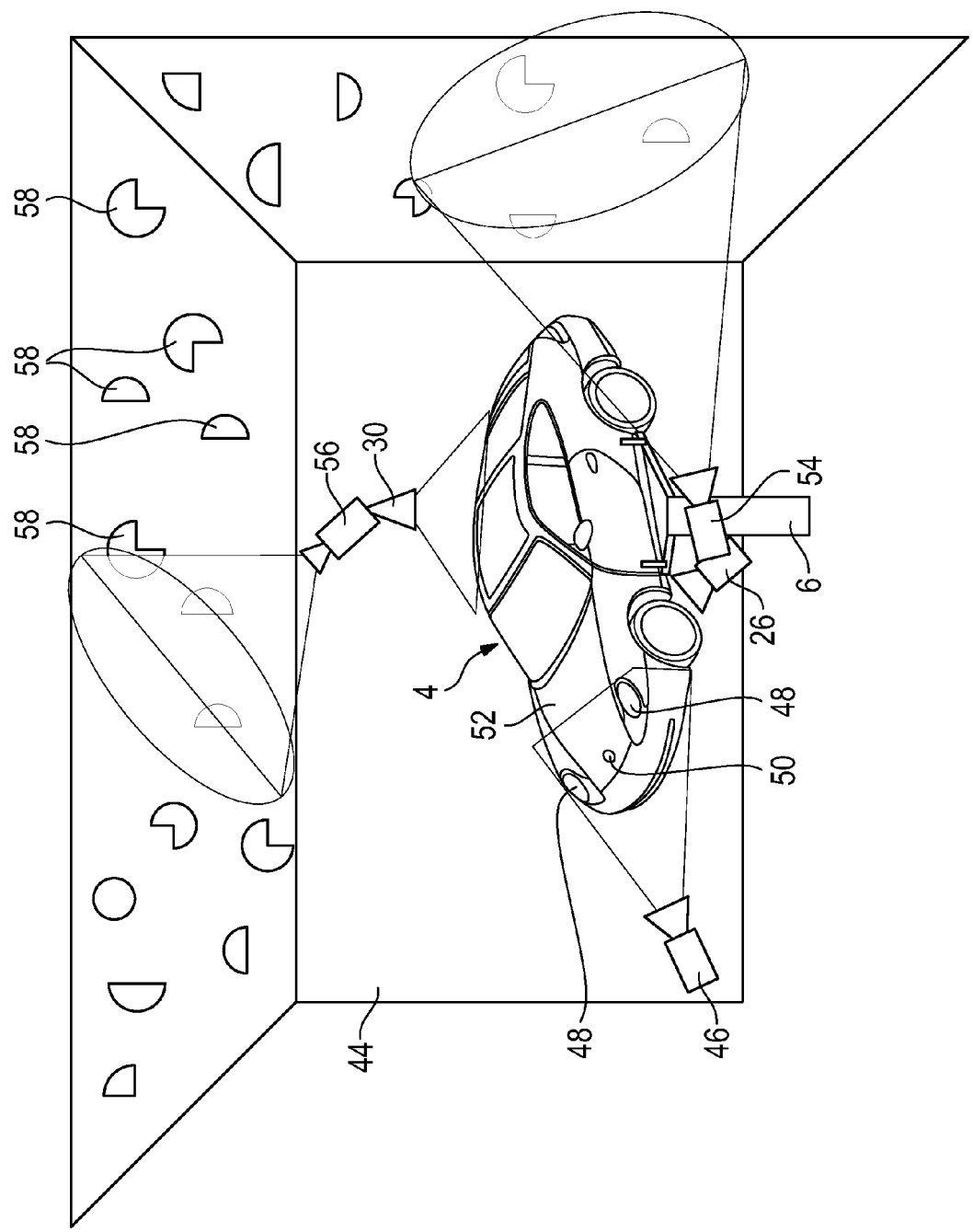
FIG. 3 shows a schematic view of a measurement system in a measurement space with reference markings.

Two methods are provided for aligning the measurement cameras and the vehicle before and after the crash test. FIG. 3 schematically illustrates the measurement cameras 26 and 30, where the reference sign 44 designates the measurement space. A symmetry camera 46 may be provided to detect at least three symmetry structures of the vehicle 4, such as headlights 48, hood ornament 50 and engine hood 52, in order to align the vehicle 4 in the same way with respect to the ascertained axes of symmetry before and after the crash test.

Orientation cameras 54, 56 may be arranged on the measurement cameras 26, 30 to detect at least three reference markings 58 arranged in the measurement space 44. Thus, the measurement cameras 26, 30 easily can be aligned for image recording. The orientation cameras 54, 56 can be arranged at a wall in the measurement space.

What is claimed is:

1. A measurement system for a crash test vehicle, comprising:
   a vehicle positioning means for positioning the test vehicle;
   a plurality of marking means for marking a plurality of measurement areas on the test vehicle;
   a plurality of measurement cameras, each of the plurality of measurement cameras having at least one image recording type of measurement sensor for obtaining images and/or image sequences of the plurality of measurement areas on the test vehicle before a crash test and after the crash test;
   orientation cameras mounted fixedly on the plurality of measurement cameras and communicating with the reference markings arranged in a measurement space;
   a control unit for controlling movements of the plurality of measurement cameras so that the plurality of measurement areas are detectable from different positions; and
   an evaluation unit comprising image fusion means for digitally fusing the obtained images and/or image sequences into a fused image of each of the plurality of measurement areas before and after the test crash.

2. The measurement system of claim 1, wherein the image fusion means are provided for optimizing optimization of transmitted image data.

3. The measurement system of claim 1, further comprising a database that stores CAD data and already ascertained image recording data.

4. The measurement system of claim 1, further comprising self-learning means for updating measurement means orientation data automatically.

5. The measurement system of claim 1, further comprising image shade detection software.

6. The measurement system of claim 1, wherein at least one of the plurality of measurement camera comprises at least two measurement sensors that differ in terms of image recording type.

7. The measurement system of claim 1, wherein at least one of the plurality of measurement camera comprises at least two measurement sensors that have the same image recording type.

8. The measurement system of claim 1, further comprising camera positioning means for positioning the plurality of measurement cameras relative to the vehicle.

9. The measurement system of claim 1, wherein the plurality of measurement cameras operate by at least one of a trilinear method, a stripe projection method, a laser triangulation method, deflectometry and a light field method.

10. The measurement system of claim 1, wherein the plurality of measurement cameras comprise symmetry cameras.

11. The measurement system of claim 1, wherein the marking means are projection apparatuses.

12. A method for performing a crash test vehicle measurement, comprising the steps of:
    positioning a plurality of measurement cameras in relation to a plurality of measurement areas of a vehicle so that at least one of the plurality of measurement cameras is directed to at least one of the plurality of measurement areas;
    aligning symmetry cameras to at least three symmetry structures on the vehicle including at least one of headlights, windshield, hood ornaments, tail lights, rear window, and tailgate;
    arranging at least three reference markings on the vehicle to align the measurement cameras sing orientation cameras that are fixedly arranged on the measurement cameras;
    recording pre-crash images and/or image sequences as image data of each of the plurality of measurement areas of the vehicle before a vehicle crash;
    transmitting the pre-crash images and/or image sequences as image data of the measurement area of the vehicle before the vehicle crash to an evaluation unit;
    carrying out the vehicle crash;
    recording post-crash images and/or image sequences as image data of each of the plurality of measurement areas of the vehicle after the vehicle crash;
    transmitting the post-crash images and/or image sequences as image data of the measurement area of the vehicle after the vehicle crash to the evaluation unit; and
    fusing each of the pre-crash images and/or image sequences as image date of each of the plurality of measurement areas with corresponding ones of the post-crash images into fused images.

13. The method of claim 12, wherein the step of recording images and/or image sequences as image data of the measurement area of the vehicle before the vehicle crash comprises aligning the measurement camera at a starting position orthogonally with respect to the measurement area; recording images and/or image sequences as image data of the measurement area, tilting the measurement camera by up to 20 degrees; recording second images and/or image sequences as image data of the measurement area; tilting the measurement camera by up to −20 degrees relative to the starting position, recording third images and/or image sequences as image data of the measurement area; rotating the measurement camera by 90 degrees with respect to the starting position; recording fourth images and/or image sequences as image data of the measurement area; tilting the measurement camera by up to 20 degrees; recording fifth images and/or image sequences as image data of the measurement area; tilting the measurement camera by up to −20 degrees relative to the position rotated by 90 degrees with respect to the starting position, recording sixth images and/or image sequences as image data of the measurement area.

14. The method of claim 12, further comprising arranging at least three marks on the vehicle and using at least one orientation camera with respect to the marks to align the measurement cameras.

15. The method of claim 12, further comprising carrying out a fully automatic calibration of measurement sensors at the beginning of each crash test and archiving the calibration values for evaluation purposes in an evaluation unit.

16. A method for performing a crash test vehicle measurement, comprising the steps of:
    positioning a plurality of measurement cameras in relation to a plurality of measurement areas of a vehicle so that at least one of the plurality of measurement cameras is directed to at least one of the plurality of measurement areas;
    arranging at least three marks on the vehicle and using at least one orientation camera with respect to the marks to align the plurality of measurement cameras;
    recording pre-crash images and/or image sequences as image data of each of the plurality of measurement areas of the vehicle before a vehicle crash;
    transmitting the pre-crash images and/or image sequences as image data of the measurement area of the vehicle before the vehicle crash to an evaluation unit;
    carrying out the vehicle crash;
    recording post-crash images and/or image sequences as image data of each of the plurality of measurement areas of the vehicle after the vehicle crash;
    transmitting the post-crash images and/or image sequences as image data of the measurement area of the vehicle after the vehicle crash to the evaluation unit; and
    fusing each of the pre-crash images and/or image sequences as image date of each of the plurality of measurement areas with corresponding ones of the post-crash images into fused images.

17. The method of claim 16, wherein the step of recording images and/or image sequences as image data of the measurement area of the vehicle before the vehicle crash comprises aligning the measurement camera at a starting position orthogonally with respect to the measurement area; recording images and/or image sequences as image data of the measurement area, tilting the measurement camera by up to 20 degrees; recording second images and/or image sequences as image data of the measurement area; tilting the measurement camera by up to −20 degrees relative to the starting position, recording third images and/or image sequences as image data of the measurement area; rotating the measurement camera by 90 degrees with respect to the starting position; recording fourth images and/or image sequences as image data of the measurement area; tilting the measurement camera by up to 20 degrees; recording fifth images and/or image sequences as image data of the measurement area; tilting the measurement camera by up to −20 degrees relative to the position rotated by 90 degrees with respect to the starting position, recording sixth images and/or image sequences as image data of the measurement area.

18. The method of claim 17, further comprising aligning symmetry cameras to at least three symmetry structures on the vehicle including at least one of headlights, windshield, hood ornaments, tail lights, rear window and tailgate.

19. The method of claim 18, further comprising arranging at least three reference markings on the vehicle to align the measurement cameras using orientation cameras that are fixedly arranged on the measurement cameras.

* * * * *